G. H. HOFFMAN.
STIRRING MECHANISM FOR COOKERS.
APPLICATION FILED FEB. 12, 1908.

907,148.

Patented Dec. 22, 1908.
2 SHEETS—SHEET 2.

Witnesses

Inventor
G. H. Hoffman,
By
Attorneys

UNITED STATES PATENT OFFICE.

GERTIE H. HOFFMAN, OF CLEARWATER, NEBRASKA.

STIRRING MECHANISM FOR COOKERS.

No. 907,148.　　　　Specification of Letters Patent.　　　　Patented Dec. 22, 1908.

Application filed February 12, 1908. Serial No. 415,533.

*To all whom it may concern:*

Be it known that I, GERTIE H. HOFFMAN, a citizen of the United States, residing at Clearwater, in the county of Antelope and State of Nebraska, have invented certain new and useful Improvements in Stirring Mechanism for Cookers, of which the following is a specification.

This invention relates to cookers, and more particularly to a stirring mechanism therefor, and has for an object to provide a mechanism of this character whereby soups, jellies, butters and etc., may be stirred during the process of making the same; means being provided whereby the stuffs are prevented from scorching or burning.

A further object of this invention is to provide means whereby the hands of the maker may be held away from the cooker and thus prevent injury to the same.

Other objects and advantages will be apparent from the following description and it will be understood that changes in the specific structure may be made within the scope of the claims without departing from the spirit of the invention.

Figure 1:
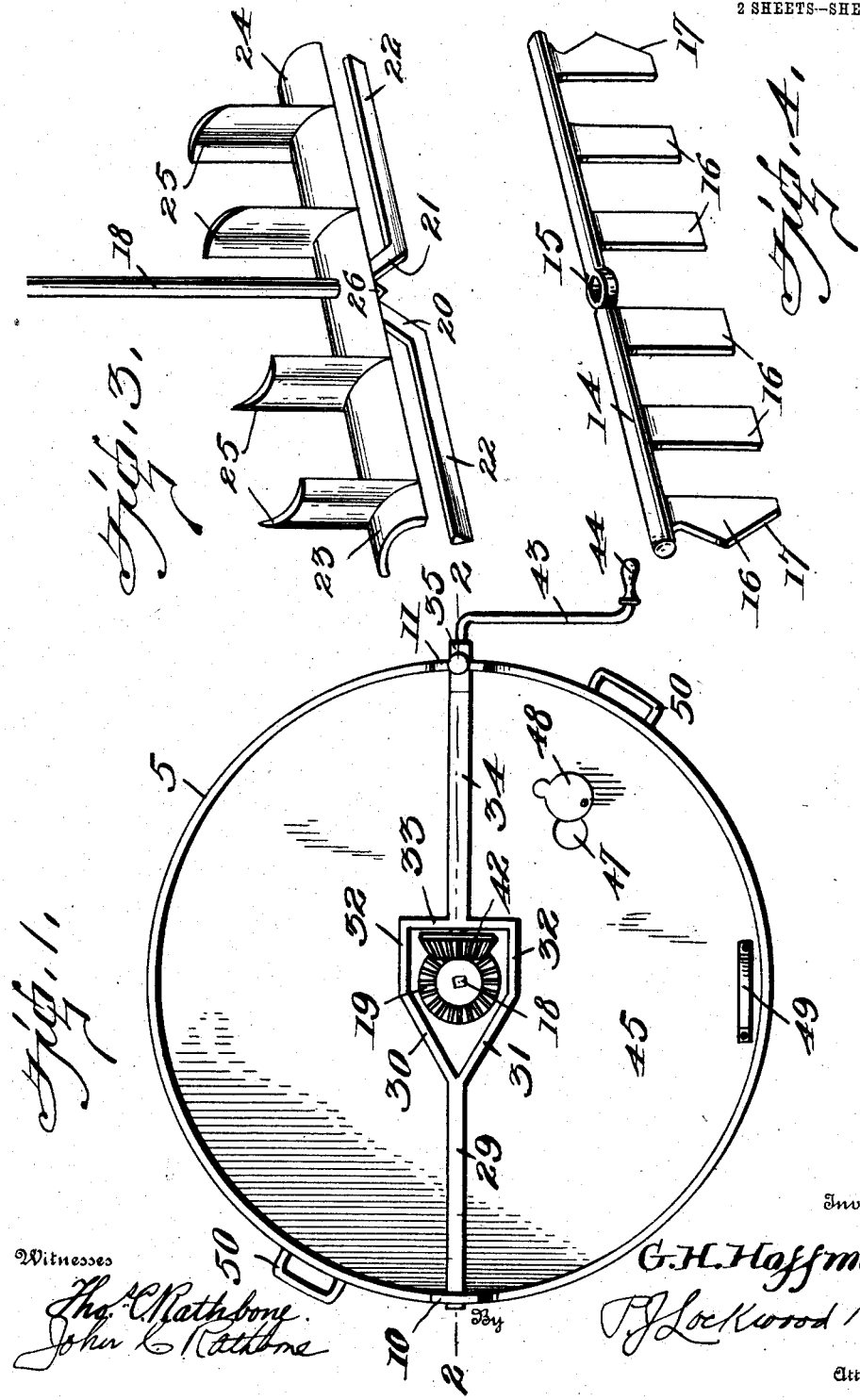
Figure 2:
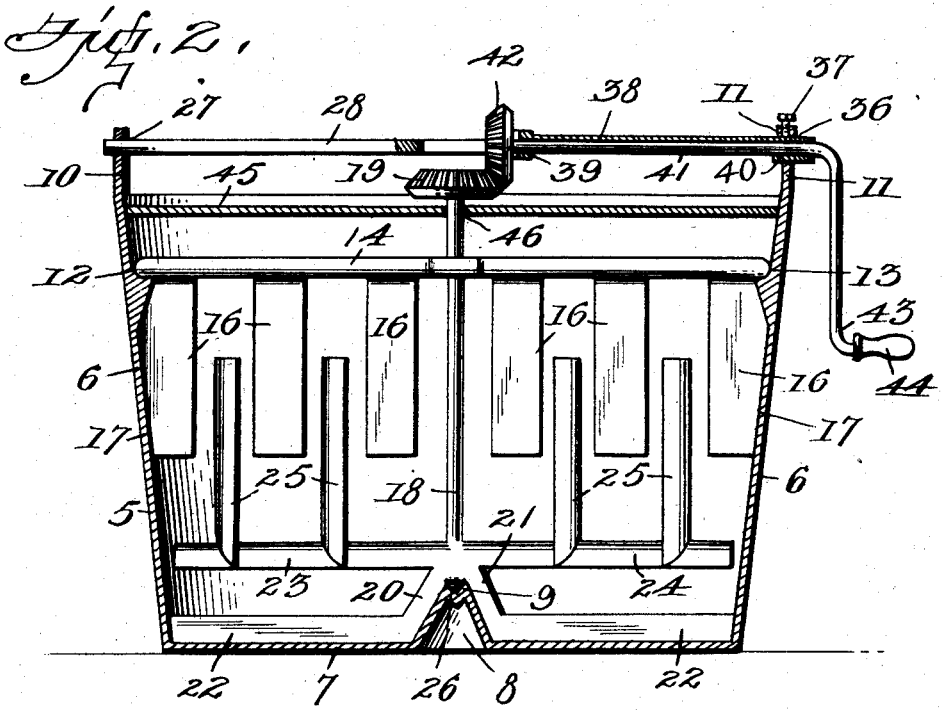
Figure 5:
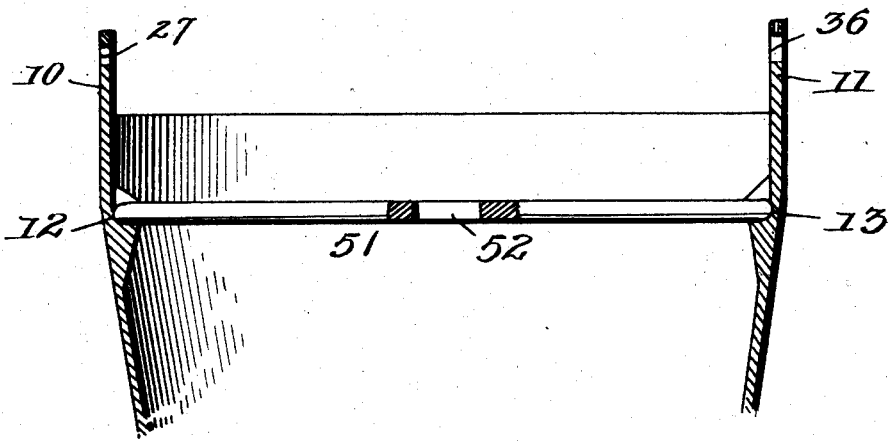

In the drawings forming a portion of this specification and in which like numerals of reference indicate similar parts in the several views, Figure 1 is a top plan view of the present invention, Fig. 2 is a vertical longitudinal sectional view on the line 2—2 of Fig. 1, Fig. 3 is a perspective view of the dasher and scraping knives, Fig. 4 is a perspective view of the retarding plate, Fig. 5 is a transverse sectional view similar to Fig. 2 showing a slightly modified form of my invention.

Referring now more particularly to the drawings, there is shown a pot or receptacle 5 provided with downwardly diverging side walls 6 and a bottom 7. The bottom 7 at its center has a portion stamped upwardly to form a conical boss 8, and at the top this boss is provided with a centrally located concavity 9 for a purpose to be hereinafter described. The receptacle is provided at its upper end with vertically disposed ears 10 and 11 respectively. The side walls 6 of the receptacle adjacent their upper edges are provided with sockets 12 and 13 as shown, and these sockets thus arranged to receive a transversely disposed retarding plate 14.

The retarding plate 14 is provided at its center with an opening 15, and at each side of this opening the plate is provided with depending wings 16. The wings at each end of the plate have their outer edges inclined as shown at 17, and these inclined edges of the wings are arranged to lie against the diverging walls of the receptacle.

Disposed in the opening 15 formed in the plate 14 there is shown a vertically extending shaft 18, and at the upper end outwardly of the plate 14 this shaft is provided with a bevel-gear 19. At the lower end, the shaft 18 is provided with downwardly inclined arms 20 and 21 respectively, and these arms are arranged to lie with their inner edges against the boss 8 and are thus arranged to revolve thereabout. At the lower ends the arms 20 and 21 are provided with outwardly directed knives 22. The knives 22 are thus arranged to scrape the bottom of the receptacle when the shaft 18 is rotated.

The shaft 18 is provided with laterally extending arms 23 and 24 respectively located above the arms 20 and 21, and these arms 23 and 24 are provided with vertically disposed agitator wings 25, and these wings are arranged for movement between the wings 16 when the shaft 18 is revolved. The wings 25 are curved transversely as shown, and the wings at one side of the shaft 18 are curved in an opposite direction from the wings at the other side of the shaft. The shaft 18 is provided with a depending stud 26 disposed between the arms 20 and 21, and this stud is seated in the concavity 9 formed in the boss 8.

The ear 10 is provided with a transversely extending passage 27, and this passage is arranged to receive the squared end of an arm 29. At the center, the arm 29 is provided with outwardly extending flared portions 30 and 31 respectively, and these portions at their outer ends are provided with portions 32, which are thus arranged in spaced relation to each other, and these portions 32 are connected by a transversely extending portion 33. The portion 33 is provided with an outwardly extending arm 34. The arm 34 at its outer end is squared as shown at 35, and this squared end of the arm is disposed in a slot 36 formed in the ear 11. The ear 11 is provided with a set-screw 37, and this set-screw is arranged to bear at its inner end against the squared end 35 of the arm 34 and thereby hold this arm securely within the slot 36 formed in the ear 11.

The arm 34 upon its under side is hollowed out as shown at 38, and this hollowed out portion is arranged between the squared end 35 and between the portion 33. The portion 33 is provided with a passage 39, and the end 35 is provided with a passage 40. The passages 39 and 40 respectively, and the hollowed out portion of the arm 34 are thus arranged to receive a horizontally disposed shaft 41, and at the inner end this shaft is provided with a bevel gear 42 arranged to mesh with the gear 19. The shaft 41 outwardly of the squared end 35 is bent to form a crank-arm 43, and this arm is provided with a handle 44.

A lid 45 is provided for the receptacle 5, and this lid is provided at its center with a passage 46 arranged to receive the shaft 18. The lid 45 is provided with a steam outlet passage 47, and this passage is closed at times by a valve 48. The lid is provided with a suitable handle 49. The receptacle 5 is provided with handles 50.

In the form of my invention shown in Fig. 5 the retarding plate 14 is omitted, and as shown I simply employ a transversely extending bar 51 which has its ends disposed in the sockets 12 and 13 as shown. The bar 51 is provided at its center with a passage 52 arranged to receive the shaft 18. The bar 51 thus serves to brace the shaft 18 and is thus a bearing for the same.

In use, stuff to be cooked is deposited within the receptacle, and after the respective parts have been properly assembled, the crank arm of the shaft 41 is revolved, whereupon the shaft 18 will be revolved to operate the agitator wings 45. In movement of the wings 25, and by reason of their curvature the stuff while being cooked will be thrown against the wings 16 and thus retard the movement of the same. It will therefore be seen that a thorough agitation is obtained. As the shaft 18 and its arms 23 and 24 are revolved it is obvious that the knives 22 will thoroughly and effectively scrape the bottom of the receptacle. The construction of the receptacle at the center is such as to prevent burning or scorching of the stuff at the center of the bottom.

What is claimed:

A receptacle of the class described having a portion of its bottom at the center thereof stamped to form an inwardly directed boss, said boss having a portion at the top thereof depressed, a removably mounted retarding plate located within the receptacle and including a plurality of depending wings arranged in spaced relation to each other, in combination with an agitator shaft having its lower end disposed in the depressed portion of said boss, lateral arms carried by said shaft, a plurality of vertically disposed wings carried by said arms and arranged for movement between the first named wings when the shaft is operated, and scraping knives carried by the shaft and arranged for operation to scrape the bottom of said receptacle, and means carried by said shaft for scraping the sides of said boss.

In testimony whereof I affix my signature, in presence of two witnesses.

GERTIE H. HOFFMAN.

Witnesses:
J. A. HOFFMAN,
J. Q. INGRAM.